US007519402B2

(12) United States Patent
Son

(10) Patent No.: US 7,519,402 B2
(45) Date of Patent: Apr. 14, 2009

(54) MOBILE TERMINAL HOLDER

(75) Inventor: Hyun-Wung Son, Gunpo (KR)

(73) Assignee: LG Electronics Inc., Seoul (KR)

(*) Notice: Subject to any disclaimer, the term of this patent is extended or adjusted under 35 U.S.C. 154(b) by 487 days.

(21) Appl. No.: 11/272,810

(22) Filed: Nov. 15, 2005

(65) Prior Publication Data

US 2006/0105803 A1 May 18, 2006

(30) Foreign Application Priority Data

Nov. 16, 2004 (KR) ..................... 10-2004-0093649

(51) Int. Cl.
*H04M 1/00* (2006.01)

(52) U.S. Cl. ................ 455/575.1; 455/573; 429/20.34; 361/699

(58) Field of Classification Search ............. 455/575.1, 455/573; 429/20, 34; 361/699
See application file for complete search history.

(56) References Cited

U.S. PATENT DOCUMENTS

| | | | | |
|---|---|---|---|---|
| 5,266,778 | A * | 11/1993 | Bailey | 219/497 |
| 5,480,734 | A * | 1/1996 | Schulz et al. | 429/7 |
| 5,606,239 | A * | 2/1997 | Schumann | 361/699 |
| 5,689,654 | A * | 11/1997 | Kikinis et al. | 710/303 |
| 6,038,128 | A * | 3/2000 | Hood et al. | 361/687 |
| 6,094,347 | A * | 7/2000 | Bhatia | 361/695 |
| 6,109,039 | A * | 8/2000 | Hougham et al. | 62/3.7 |
| 6,118,654 | A * | 9/2000 | Bhatia | 361/687 |
| 6,172,871 | B1 * | 1/2001 | Holung et al. | 361/687 |
| 6,204,639 | B1 * | 3/2001 | Takano et al. | 320/150 |
| 6,239,970 | B1 * | 5/2001 | Nakai et al. | 361/695 |
| 6,256,193 | B1 * | 7/2001 | Janik et al. | 361/683 |
| 6,326,097 | B1 * | 12/2001 | Hockaday | 429/34 |
| 6,415,612 | B1 * | 7/2002 | Pokharna et al. | 62/3.2 |
| 6,453,378 | B1 * | 9/2002 | Olson et al. | 710/304 |
| 6,459,574 | B1 * | 10/2002 | Ghosh | 361/687 |
| 6,560,104 | B2 * | 5/2003 | DeHoff et al. | 361/687 |
| 7,206,201 | B2 * | 4/2007 | Behl et al. | 361/687 |
| 7,306,386 | B2 * | 12/2007 | Lyman et al. | 400/88 |
| 2001/0003416 | A1 * | 6/2001 | Kajiura | 320/109 |
| 2002/0195991 | A1 | 12/2002 | Son | |
| 2003/0100340 | A1 * | 5/2003 | Cupps et al. | 455/556 |
| 2005/0193742 | A1 * | 9/2005 | Arnold | 62/3.5 |
| 2006/0227516 | A1 * | 10/2006 | Huang et al. | 361/729 |
| 2006/0267294 | A1 * | 11/2006 | Busse et al. | 279/128 |
| 2007/0043961 | A1 * | 2/2007 | Cupps et al. | 713/300 |
| 2007/0232365 | A1 * | 10/2007 | Kogan | 455/573 |
| 2008/0082043 | A1 * | 4/2008 | Janssen | 604/68 |

FOREIGN PATENT DOCUMENTS

| | | |
|---|---|---|
| CN | 2257106 | 6/1997 |
| CN | 1391417 | 1/2003 |

* cited by examiner

*Primary Examiner*—Minh D Dao
(74) *Attorney, Agent, or Firm*—Greenblum & Bernstein, P.L.C.

(57) ABSTRACT

A mobile terminal holder includes a body configured to receive a mobile terminal mounted thereon, and a receiving portion provided in the body. The receiving portion is configured to receive a cooling element for heat-exchange with a mobile terminal mounted on the body. Even if the mobile terminal is used for a long period of time mounted on the holder, heat generated from the mobile terminal can be effectively dissipated. In this manner, defective operation of the mobile terminal, due to degradation in reliability of components resulting from temperature increase of the mobile terminal, can be prevented.

23 Claims, 4 Drawing Sheets

100 160 112 111 III 110 114 160 141 III 121 140 130 120 121 105

MOBILE TERMINAL HOLDER

BACKGROUND OF THE INVENTION

This application claims the benefit of Korean Application No. 10-2004-93649, filed on Nov. 16, 2004, which is hereby incorporated by reference in its entirety.

1. Field of the Invention

The present invention relates to a mounting device for a mobile terminal, and in particular to a holder for a mobile terminal configured to effectively dissipate heat generated by a mobile terminal.

2. Description of the Background Art

FIG. 1 is a perspective view that illustrates a conventional mounting device for a mobile terminal. A conventional mounting device 10 for a mobile terminal includes a mounting groove 11 in which the mobile terminal is mounted. Longitudinal side walls 13 of the mounting groove 11 are formed higher than a lower surface 12 of the mounting groove 11. A charging terminal 14 is provided at a lowermost end of the lower surface 12, and is configured to electrically contact a battery charging terminal of a mobile terminal inserted in the mounting groove 11.

To recharge a battery of a mobile terminal, a user mounts the mobile terminal in the mounting groove 11 of the mounting device 10. A charging terminal of the mobile terminal and the charging terminal 14 of the mounting device 10 are in electric contact with each other, so that the mobile terminal can be recharged.

Currently, the use of mobile terminals is not limited to only phone conversations, but has been extended to include various multimedia functions, such as electronic games, movies, news and similar applications. When such multimedia functions are used, the mobile terminal is often operated for an extended period of time. However, because the battery capacity of the mobile terminal is generally limited, users often are unable to use the multimedia function for as long as they want.

To solve such problems, a mobile terminal may be used while mounted in a mounting device or holder which can recharge a battery of the mobile terminal. In this manner, the various multimedia functions can be operated for a sufficient amount of time on the mobile terminal without being unduly limited by the battery capacity.

One drawback to the use of such a mounting device is that a large amount of heat may be generated from the battery when the mobile terminal is used for a long period of time while mounted on the mounting device. However, because the conventional mounting device is designed only for recharging, rather than for extended use of a mobile terminal while mounted therein, releasing or dissipation of the heat generated from the mobile terminal has not been accounted for in the design. For this reason, if a mobile terminal is used for a long period of time while mounted on the mounting device, a temperature of the mobile terminal may be increased to undesirable levels. This can result in defective operation of components within the mobile terminal, and degraded reliability thereof. Also, when a phone call is received while the mobile terminal is being used on the mounting device, such high temperature heat generated from the mobile terminal may be uncomfortable for the user.

BRIEF DESCRIPTION OF THE INVENTION

Therefore, an object of the present invention is to provide a mounting device for a mobile terminal configured to prevent defective operation of internal components of a mobile terminal due to degraded reliability thereof, and to provide for comfortable use thereof.

An aspect of the present invention includes a mobile terminal holder which includes a body configured to receive a mobile terminal mounted thereon, and a receiving portion provided in the body and configured to receive a cooling element for heat-exchange with a mobile terminal mounted on the body. A surface of the cooling element contacts a surface of the mobile terminal or a battery of the mobile terminal. The cooling element is inserted and removably held within the receiving portion. At least one coupling protrusion is provided, along with at least one coupling groove in which the at least one coupling protrusion is slidingly received along a direction in which the cooling element is inserted into the receiving portion. The at least one coupling protrusion includes coupling protrusions formed on opposite sides of the cooling element, and the at least one coupling groove includes coupling grooves formed on opposite inner side walls of the receiving portion, such that the coupling protrusions are received within the coupling grooves. An air flow passage is provided in the receiving portion when the cooling element is received therein, the air flow passage communicating with the outside.

A plurality of receiving portions are provided in the body, each of the receiving portions being configured to receive a cooling element. The plurality of receiving portions include a first receiving portion configured to receive a first cooling element that contacts a surface of the mobile terminal, and a second receiving portion that is provided in the body at a predetermined interval from the first receiving portion and configured to receive a second cooling element. The first receiving portion and the second receiving portion are separated from each other by a plate having a predetermined thickness. Air flow passages for heat exchange are provided in the first and second receiving portions when the first and second cooling elements are received therein, the air flow passages communicating with the outside. The body is configured such that when the first cooling element reaches a predetermined temperature due to heat exchanged with the mobile terminal, the first and second cooling elements may be exchanged such that the first cooling element is received in the second receiving portion and the second cooling element is received in the first receiving portion.

The cooling element includes a cooling pad. A refrigerant is provided within the cooling pad. A plurality of heat releasing pins are provided on a surface of the cooling pad. A temperature indicator is provided on the cooling pad. The temperature indicator includes a temperature indicating sticker that varies its color according to the temperature. A charging terminal is provided on the body for recharging the mobile terminal. The body includes a receiving terminal connected to an output terminal of the mobile terminal, and at least one speaker that amplifies sound outputted from the mobile terminal.

Another aspect of the present invention includes a holder which includes a body having a charging terminal on which a mobile terminal is mounted. A first receiving portion is provided on the body, and a first cooling element is releasably received in the first receiving portion and contacts a surface of the mobile terminal. A second receiving portion is provided on the body, spaced apart from the first receiving portion by a predetermined interval, and a second cooling element is releasably received in the second receiving portion.

Air flow passages for heat exchange are provided in the first and second receiving portions when the first and second cooling elements are received therein, the air flow passages communicating with the outside. The body is configured such that when the first cooling element reaches a predetermined temperature due to heat exchanged with the mobile terminal, the first and second cooling elements may be exchanged such that the first cooling element is received in the second receiving portion and the second cooling element is received in the first receiving portion.

Another aspect of the present invention includes a method for dissipating heat generated by a mobile terminal, including mounting a mobile terminal on a holder; providing a cooling element in a receiving portion of the holder; and exchanging heat between the mobile terminal and the cooling element. A surface of the mobile terminal contacts a surface of the cooling element. A battery of the mobile terminal contacts a surface of the cooling element. An air flow passage is provided in the receiving portion, the air flow passage communicating with the outside for heat-exchange with the cooling element. The mobile terminal is charged while mounted on the holder. The step of providing a cooling element includes providing a cooling pad having a temperature indicator. The step of providing a cooling element includes providing a first cooling element in a first receiving portion of the holder, in which the first cooling element contacts a surface of the mobile terminal; and providing a second cooling element in a second receiving portion of the holder spaced from the first receiving portion. The first cooling element and the second cooling element are exchanged when the first cooling element reaches a predetermined temperature due to heat exchanged with the mobile terminal, such that the first cooling element is received in the second receiving portion and the second cooling element is received in the first receiving portion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

The invention will be described in detail with reference to the following drawings in which like reference numerals refer to like elements, wherein.

DETAILED DESCRIPTION OF THE INVENTION

Embodiments of the present invention will be described in detail with reference to the accompanying drawings.

Figure 1:
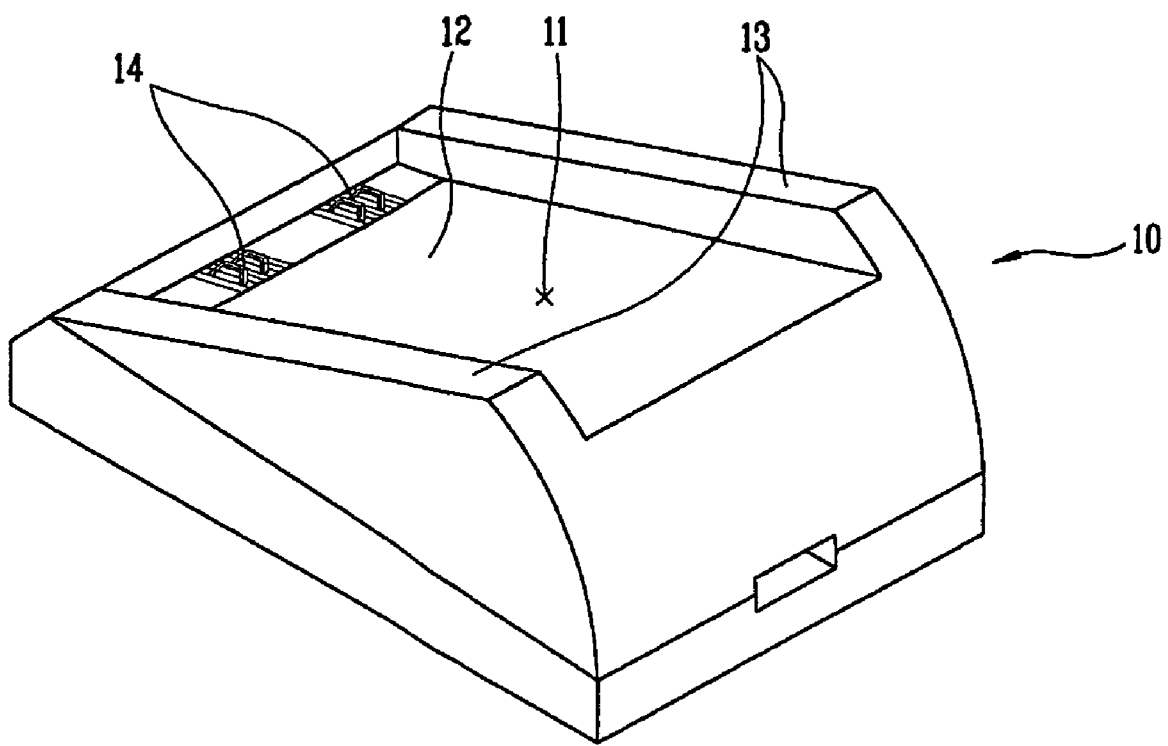
FIG. 1 is a perspective view of a conventional mounting device for a mobile terminal.
Figure 2:
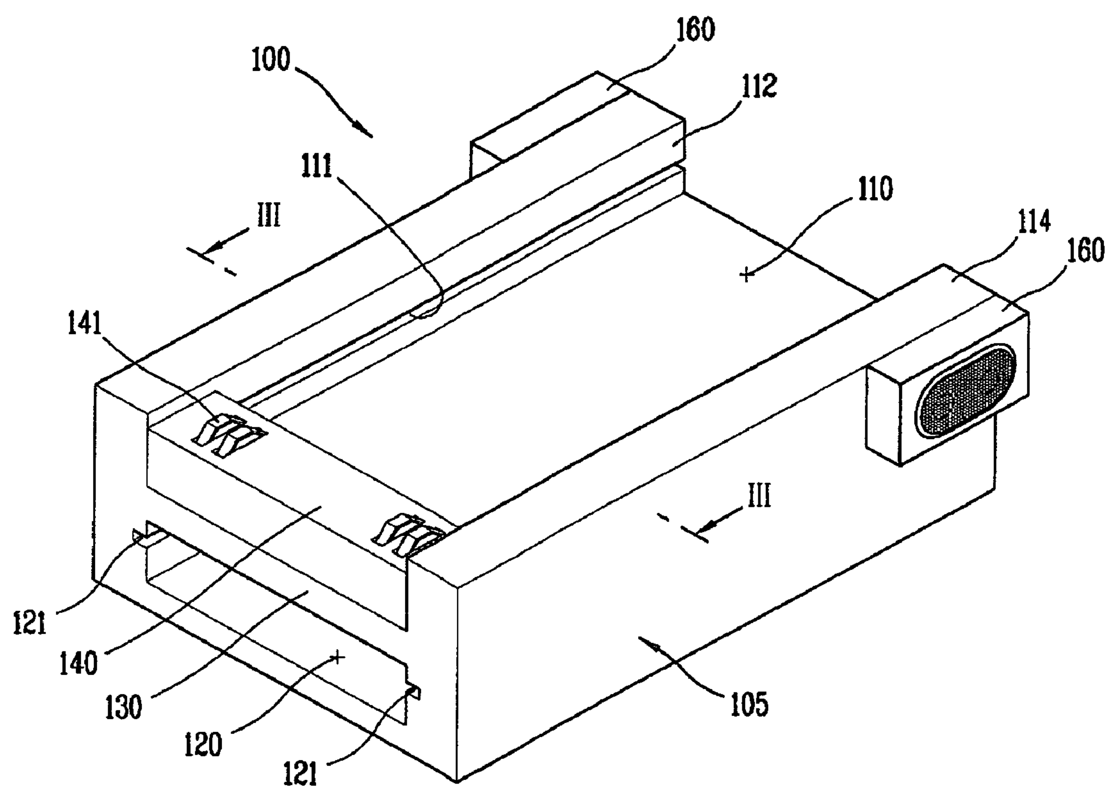
FIG. 2 is a perspective view of a holder for a mobile terminal in accordance with an embodiment of the present invention.
Figure 3:
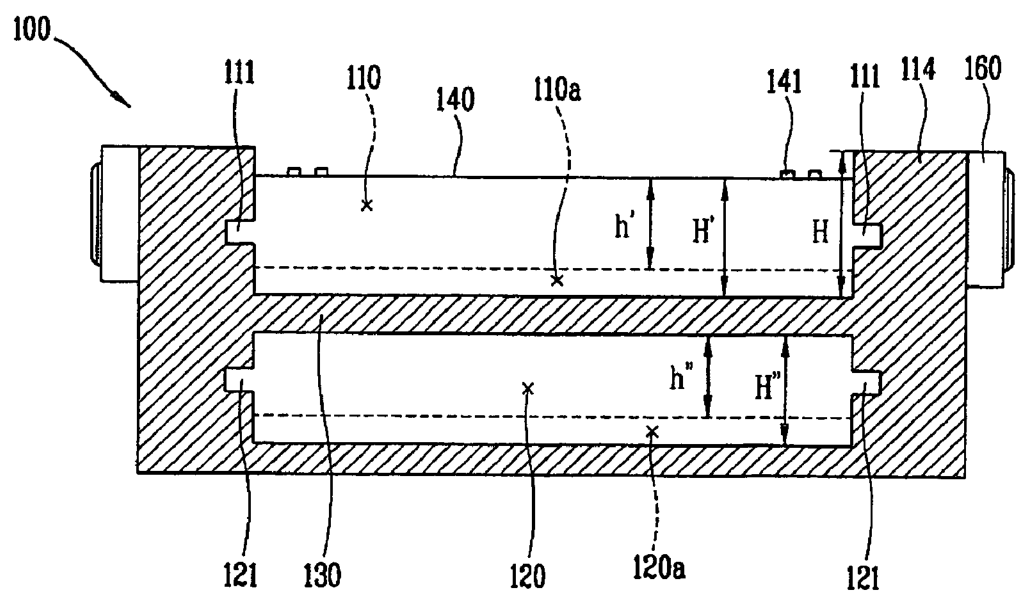
FIG. 3 is a sectional view taken along line III-III of FIG. 2.
Figure 4:
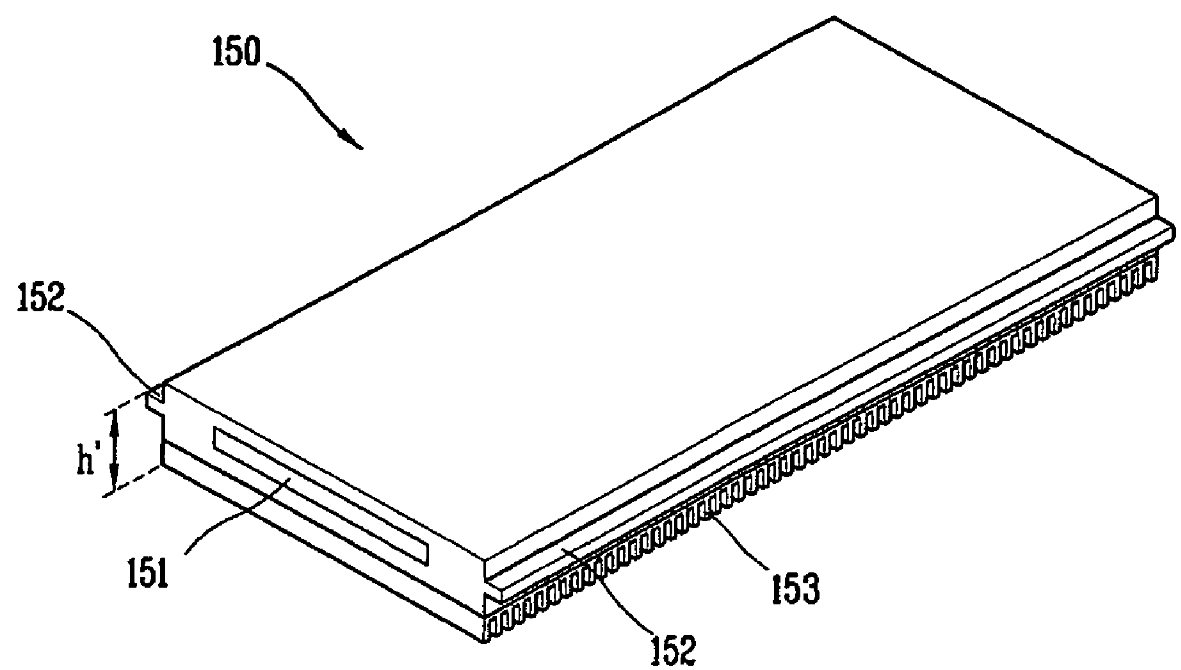
FIG. 4 is a perspective view of a cooling pad used in a holder for a mobile terminal in accordance with an embodiment of the present invention.
Figure 5:
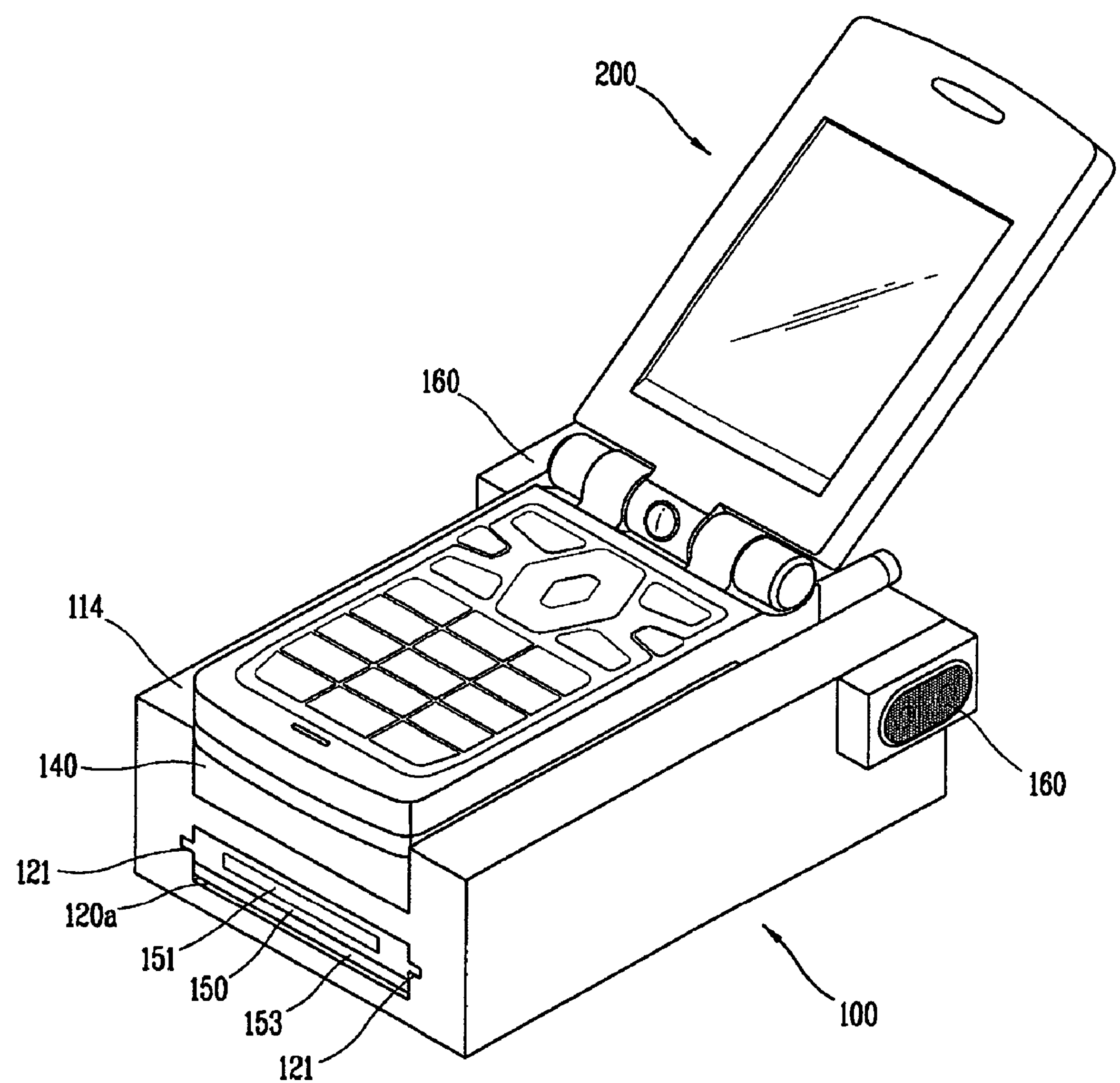
FIG. 5 is a perspective view of a mobile terminal mounted on the holder for a mobile terminal in accordance with an embodiment of the present invention.

FIG. 2 is a perspective view of a holder or mounting device for a mobile terminal in accordance with an embodiment of the present invention, and FIG. 3 is a sectional view taken along line III-III of FIG. 2. FIG. 4 is a perspective view of a cooling element or pad used in the mobile terminal holder in accordance with an embodiment of the present invention, and FIG. 5 is a perspective view of a mobile terminal which is mounted in the holder in accordance with an embodiment of the present invention.

As shown, a holder 100 for a mobile terminal in accordance with an embodiment of the present invention includes a body 105 on which a mobile terminal 200 is mounted, and a cooling pad 150 received in the body 105 for releasing or dissipating the heat generated from the mobile terminal 200 to the outside by heat exchange. It is noted that the mobile terminal can be any suitable type of mobile communication terminal, such as a mobile phone, or a personal digital assistant (PDA), for example. Further, it is noted that any suitable type of cooling element which is capable of performing the heat-exchange function can be provided.

The body 105 includes a first receiving portion 110 and a second receiving portion 120, each having a predetermined space for receiving respective cooling pads 150. The first receiving portion 110 is formed so as to be open in a direction that the mobile terminal 200 is mounted and that the cooling pad 150 is received. Therefore, when the mobile terminal 200 is mounted on the body 105 of the holder 100, one surface of the mobile terminal 200 comes into contact with one surface of the cooling pad 150 received in the first receiving portion 110. In this manner surfaces of the mobile terminal 200 and the cooling pad 150 directly contact with each other which facilitates heat transfer therebetween. Instead, a suitable heat transfer contact structure may be formed on a surface of the cooling pad 150 which faces a surface of the mobile terminal 200, to allow for indirect contact between the mobile terminal 200 and the cooling pad 150. The cooling pad 150 can directly contact the battery of the mobile terminal, which generates a large amount of the heat.

The cooling pad 150 is inserted and removably connected with the first receiving portion 110. Any suitable structure for positioning the cooling pad 150 in the receiving portion may be provided. In the illustrated embodiment, a coupling groove 111 is formed at an inner surface or sidewall 112 of the first receiving portion 110 along a direction in which the cooling pad 150 is inserted into the first receiving portion 110. As shown in FIG. 2, coupling grooves 111 can be provided on opposed inner sidewalls 112 of the first receiving portion. Coupling protrusions 152, corresponding to the coupling grooves 111, are formed on both lateral sides of the cooling pad 150. It is noted that the connecting structure is not limited to that shown in FIG. 2. For example, coupling protrusions may be formed on sidewalls of the first receiving portion 110, and coupling grooves may be formed on lateral sidewalls of the cooling pad 150.

A charging portion 140, which includes a charging terminal 141 for recharging the mobile terminal 200, is formed at one end of the first receiving portion 110. The charging portion 140 defines a position where the mobile terminal 200 is mounted on the body 105 of the holder 100, and also limits a distance that the cooling pad 150 is inserted into the first receiving portion 110. The position of the charging terminal 141 along the charging portion 140 may vary, but should correspond with a position of a charging terminal of a mobile terminal 200 mounted on the holder 100.

Referring to FIG. 3, it can be seen that a height H' of the charging portion 140 is smaller than a depth H of the first receiving portion 110. Further, the height H' of the charging portion 140 is the same as a height from the bottom of the first receiving portion 110 to an upper surface of a cooling pad 150 inserted in the first receiving portion 110. However, it is noted that these relative heights are exemplary, and that any suitable dimensions of these structures could be provided.

A first heat exchange passage or space 110*a*, through which outside air flows, is provided at the first receiving portion 110 when the cooling pad 150 is received in the first receiving portion 110. As shown in FIGS. 3 and 4, the cooling pad 150 has a width or thickness h' that is smaller than a depth H of the first receiving portion 110, and is also smaller than a height H' of the charging portion 140. Accordingly, when the cooling pad 150 is received in the first receiving portion 110 at the same level as the height of the charging portion 140, the first heat exchange space 110*a* is formed between a bottom of the cooling pad 150 and the bottom surface of the first receiving portion 110, thereby allowing the outside air to flow therein.

The second receiving portion 120 is formed in the body 105 of the holder 100 at a predetermined interval from the first receiving portion 110. Similar to the first receiving portion 110, the second receiving portion 120 is also configured to receive a cooling pad 150. The second receiving portion 120 is separated from the first receiving portion 110 by a separation plate 130 of a predetermined thickness. Although not required, the separation plate 130 can be an integral part of the body 105 of the holder 100.

The second receiving portion 120 also includes coupling grooves 121 formed in its sidewall surfaces along a direction in which the cooling pad 150 is inserted into the second receiving portion 120, the coupling grooves corresponding to the coupling protrusions of the cooling pad 150. As noted above with respect to the first receiving portion 110, the coupling grooves may instead be formed on lateral sidewalls of the cooling pad 150, and the coupling protrusions may be formed on sidewalls of the second receiving portion 120.

A second heat exchange passage or space 120*a*, through which outside air flows, is provided at the second receiving portion 120 when the cooling pad 150 is received in the second receiving portion 120. As shown in FIGS. 3 and 4, the cooling pad 150 has a width or thickness h" (which may be the same as the width h' discussed above with respect to the first receiving portion 110) that is smaller than a depth H" of the second receiving portion 120. Accordingly, when the cooling pad 150 is received in the second receiving portion 120, the second heat exchange space 120*a* is formed between a bottom of the cooling pad 150 and the bottom surface of the second receiving portion 120, thereby allowing the outside air to flow therein.

Although not necessarily required, it is noted that in the embodiment depicted in FIGS. 2 and 3, the first receiving portion 110 and the second receiving portion 120 have the same widths, and the coupling grooves 111 and 121 are the same size. In this manner, the cooling pads 150 which are respectively received in the first and second receiving portions 110 and 120 may be readily exchanged. For example, after the cooling pad 150 received in the first receiving portion 110 reaches a predetermined temperature due to the heat-exchanged with the mobile terminal 200, it may be exchanged with the cooling pad 150 received in the second receiving portion 120 (which is in a cooled condition). Accordingly, a replacement cooling pad 150 is provided in the second receiving portion. Further, the cooling pads 150 received in both receiving portions 110, 120 are themselves cooled by outside air flowing through the cooling passages 110*a*, 120*a*.

The cooling pad 150 has predetermined internal space therein, and the internal space contains a refrigerant to accelerate heat transfer. However, as noted above, any suitable cooling element can be provided.

A temperature indicator 151 is provided at one side of the cooling pad 150 and indicates a surface temperature of the cooling pad 150. The temperature indicator 151 can indicate a condition in which the cooling pad 150 has been increased to a temperature which requires replacement or exchange of the cooling pad 150. It is noted that such a temperature would normally be a temperature level at which heat-exhange with the mobile terminal 200 can no longer be performed efficiently or effectively. Although any suitable temperature indicator can be provided, the temperature indicator 151 can be a temperature indicating sticker that varies its color according to temperature.

A plurality of heat releasing pins 153 are provided along a surface of the cooling pad 150 which is opposite to the surface which contacts the mobile terminal 200. As depicted in the Figures, the heat releasing pins 153 protrude from a bottom surface of the cooling pad 150, and extend toward the cooling passages 110*a*, 120*a*. In this manner, the heat releasing pins 153 effectively enlarge a surface area contacting with the outside air flow in the cooling passages 110*a*, 120*a*, which accelerates release of the heat generated from the mobile terminal 200. The heat releasing pins 153 can be made of any suitable material, such as a metal having high heat conductivity, such as aluminum.

The body 105 may include a reception terminal which can be electrically connected to an information output terminal of a mobile terminal mounted in the holder 100. The body 105 can also include at least one speaker 160 that amplifies sound output from the mobile terminal. Such speakers 160 can enhance the use of the multimedia functions while a mobile terminal is mounted in the holder 100. As shown in the drawing, speakers 160 may be installed on outer sides of the body 105. However, the speaker locations may be varied, such as on front and rear sides of the body 105.

Although the drawings depict an embodiment having two receiving portions, it is clear that any suitable number of receiving portions may be provided in the body 105 in order to accommodate any suitable number of cooling elements.

The operation of the holder for a mobile terminal in accordance with one embodiment of the present invention will now be described. For the purpose of this description, the cooling pad 150 received in the first receiving portion 110 will be referred to as a first cooling pad and the cooling pad 150 received in the second receiving portion 120 will be referred to as a second cooling pad.

The first cooling pad is received in the first receiving portion 110. A mobile terminal 200 is mounted on the body 105 of the holder 100 such that one surface of the first cooling pad comes in contact with a surface of the mobile terminal 200, such as a surface of the battery. A user may then operate various multimedia functions of the mobile terminal 200 mounted in the holder 100. As the mobile terminal 200 generates heat during use, heat-exchange takes place with the first cooling pad, which accelerates release and dissipation of heat generated from the mobile terminal 200 to the outside. For example, heat transmitted to the first cooling pad is transmitted to the heat releasing pins 153 formed at the bottom of the first cooling pad. The air in the first heat exchange space 110*a* of the first receiving portion 110 is heated by the heat releasing pins 153, and released to the outside.

As the mobile terminal 200 is cooled, a surface temperature of the first cooling pad is increased. When a color change of the temperature indicating sticker 151 indicates that a predetermined temperature has been reached, the user pulls out the first cooling pad from the first receiving portion 110 and exchanges it with the second cooling pad received in the second receiving portion 120, which is in a cooled condition.

The first cooling pad may then be received in the second receiving portion to be cooled.

As described, when a user operates multimedia functions or other functions for a long time with a mobile terminal mounted on the holder, heat generated from the mobile terminal can be effectively released to the outside, and an increase in temperature of the mobile terminal can be controlled or avoided. Accordingly, defective operation occurring due to degradation in reliability of internal components of the mobile terminal due to overheating can be prevented. Further, the cooling pad which has been heated by absorbing heat from the mobile terminal can be exchanged with another cooling pad in a cooled condition, thereby improving heat release and dissipation efficiency. In addition, the user discomfort can be prevented, since there is no longer a problem with heat when a user receives a phone call while using the mobile terminal in the holder.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds, are therefore intended to be embraced by the appended claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile terminal holder comprising:

a body configured to receive a mobile terminal mounted thereon;

a receiving portion provided in the body and configured to receive a cooling element, said cooling element being inserted and removably held within the receiving portion, said cooling element being configured to heat-exchange with a mobile terminal mounted on the body for cooling the mobile terminal; and at least one coupling protrusion and at least one coupling groove in which the at least one coupling protrusion is slidingly received along a direction in which the cooling element is inserted into the receiving portion, the at least one coupling protrusion including coupling protrusions formed on opposite sides of the cooling element, and the at least one coupling groove including coupling grooves formed on opposite inner side walls of the receiving portion, such that the coupling protrusions are received within the coupling grooves.

2. The holder according to claim 1, wherein a surface of the cooling element contacts a surface of the mobile terminal.

3. The holder according to claim 2, wherein the surface of the cooling element contacts a battery of the mobile terminal.

4. The holder according to claim 1, wherein an air flow passage is provided in the receiving portion when the cooling element is received therein, the air flow passage communicating with the outside.

5. The holder according to claim 1, wherein the cooling element comprises a cooling pad.

6. The holder according to claim 5, wherein a refrigerant is provided within the cooling pad.

7. The holder according to claim 5, wherein a plurality of heat releasing pins are provided on a surface of the cooling pad.

8. The holder according to claim 5, wherein a temperature indicator is provided on the cooling pad.

9. The holder according to claim 8, wherein the temperature indicator comprises a temperature indicating sticker that varies its color according to the temperature.

10. The holder according to claim 1, further comprising a charging terminal provided on the body for recharging the mobile terminal.

11. The holder according to claim 1, wherein the body includes a receiving terminal connected to an output terminal of the mobile terminal, and at least one speaker that amplifies sound outputted from the mobile terminal.

12. A mobile terminal holder comprising:

a body configured to receive a mobile terminal mounted thereon; and a receiving portion provided in the body and configured to receive a cooling element for heat-exchange with a mobile terminal mounted on the body, wherein a plurality of receiving portions are provided in the body, each of the receiving portions being configured to receive a cooling element.

13. The holder according to claim 12, wherein the plurality of receiving portions comprise:

a first receiving portion configured to receive a first cooling element that contacts a surface of the mobile terminal; and a second receiving portion that is provided in the body at a predetermined interval from the first receiving portion and configured to receive a second cooling element.

14. The holder according to claim 13, wherein the first receiving portion and the second receiving portion are separated from each other by a plate having a predetermined thickness.

15. The holder according to claim 13, wherein air flow passages for heat exchange are provided in the first and second receiving portions when the first and second cooling elements are received therein, the air flow passages communicating with the outside.

16. The holder according to claim 13, wherein the body is configured such that when the first cooling element reaches a predetermined temperature due to heat exchanged with the mobile terminal, the first and second cooling elements may be exchanged such that the first cooling element is received in the second receiving portion and the second cooling element is received in the first receiving portion.

17. A holder comprising:

a body having a charging terminal on which a mobile terminal is mounted;

a first receiving portion provided on the body;

a first cooling element releasably received in the first receiving portion and contacting a surface of the mobile terminal;

a second receiving portion provided on the body and spaced apart from the first receiving portion by a predetermined interval; and a second cooling element releasably received in the second receiving portion.

18. The holder according to claim 17, wherein air flow passages for heat exchange are provided in the first and second receiving portions when the first and second cooling elements are received therein, the air flow passages communicating with the outside.

19. The holder according to claim 17, wherein the body is configured such that when the first cooling element reaches a predetermined temperature due to heat exchanged with the mobile terminal, the first and second cooling elements may be exchanged such that the first cooling element is received in the second receiving portion and the second cooling element is received in the first receiving portion.

20. A method for dissipating heat generated by a mobile terminal, comprising:

mounting a mobile terminal on a holder;

providing a cooling element in a receiving portion of the holder; and exchanging heat between the mobile terminal and the cooling element, wherein the step of providing a cooling element comprises:

providing a first cooling element in a first receiving portion of the holder, in which the first cooling element contacts a surface of the mobile terminal; and providing a second cooling element in a second receiving portion of the holder spaced from the first receiving portion.

21. The method according to claim 20, further comprising exchanging the first cooling element and the second cooling element when the first cooling element reaches a predetermined temperature due to heat exchanged with the mobile terminal, such that the first cooling element is received in the second receiving portion and the second cooling element is received in the first receiving portion.

22. A mobile terminal holder comprising:

a body configured to receive a mobile terminal mounted thereon; and a receiving portion provided in the body and configured to receive a cooling pad, said cooling pad being configured to heat-exchange with a mobile terminal mounted on the body for cooling the mobile terminal, wherein a plurality of heat releasing pins are provided on a surface of the cooling pad.

23. A mobile terminal holder comprising:

a body configured to receive a mobile terminal mounted thereon; and a receiving portion provided in the body and configured to receive a cooling pad, said cooling pad being configured to heat-exchange with a mobile terminal mounted on the body for cooling the mobile terminal, wherein a temperature indicator is provided on the cooling pad, the temperature indicator comprising a temperature indicating sticker that varies its color according to the temperature.

* * * * *